United States Patent [19]
Ikeda

[11] Patent Number: 6,095,296
[45] Date of Patent: Aug. 1, 2000

[54] DUO-SERVO TYPE DRUM BRAKE DEVICE

[75] Inventor: Takashi Ikeda, Nagoya, Japan

[73] Assignee: Nisshinbo Industries, Inc., Tokyo, Japan

[21] Appl. No.: 09/035,833

[22] Filed: Mar. 6, 1998

[30] Foreign Application Priority Data

Apr. 3, 1997 [JP] Japan .................................. 9-085038

[51] Int. Cl.[7] .............................. F16D 51/48; F16D 65/09
[52] U.S. Cl. .............. 188/331; 188/106 F; 188/196 BA; 188/216; 188/79.54; 188/79.56; 188/340
[58] Field of Search ..................................... 188/325, 331, 188/332, 333, 327, 106 F, 328, 79.51, 79.54, 79.56, 79.63, 196 BA, 79.64, 216, 106 A, 78, 340

[56] References Cited

U.S. PATENT DOCUMENTS

| | | |
|---|---|---|
| 2,109,091 | 2/1938 | Press ........................................ 188/331 |
| 2,280,784 | 4/1942 | Berno . | 
| 3,255,849 | 6/1966 | Swift . |
| 3,425,521 | 2/1969 | Maurice . |
| 3,870,131 | 3/1975 | Firth et al. . |
| 4,589,527 | 5/1986 | Danne et al. ......................... 188/79.54 |
| 4,768,631 | 9/1988 | Heibel . |
| 5,819,887 | 10/1998 | Asai et al. ............................ 188/106 F |
| 5,924,529 | 7/1999 | Ikeda et al. .............................. 188/331 |

FOREIGN PATENT DOCUMENTS 410281190A 10/1998 Japan .

*Primary Examiner*—Douglas C. Butler
*Attorney, Agent, or Firm*—Young & Thompson

[57] ABSTRACT

In order to indirectly open brake shoes (3, 4) through a link (19) pivoted on one of the brake shoes (3) at a location of a brake shoe holding mechanism (5), and to operate the brake shoes (3, 4) away from a shoe gap adjuster (11) while one of the brake shoes (3) is kept abutting against an anchor member (10), when rotating a lever (20) with a force (W) and operating a wheel cylinder (16) to operate brake shoes (3, 4), a moment of rotation caused by the return spring (13) is set to be larger than a moment of rotation caused by the return spring (15).

20 Claims, 4 Drawing Sheets

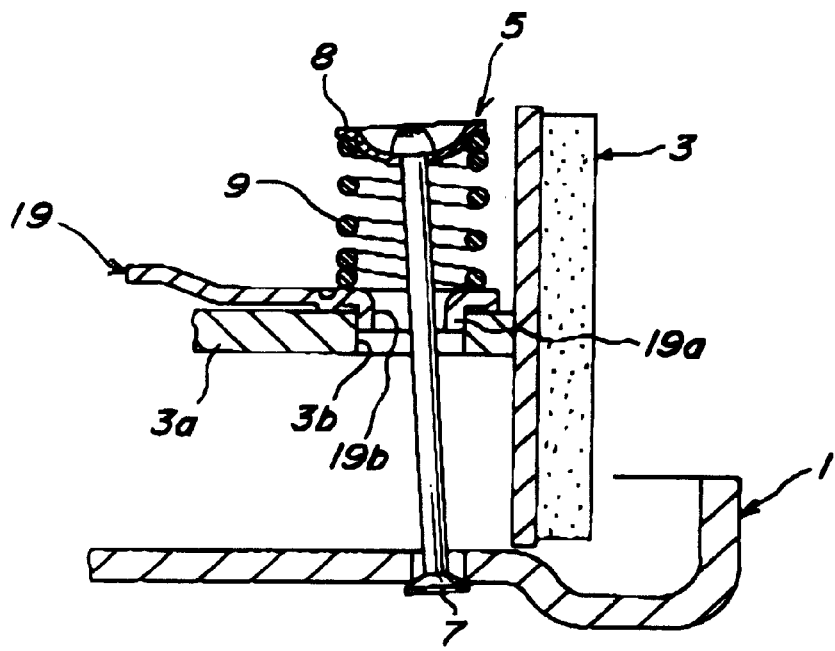
FIG_2
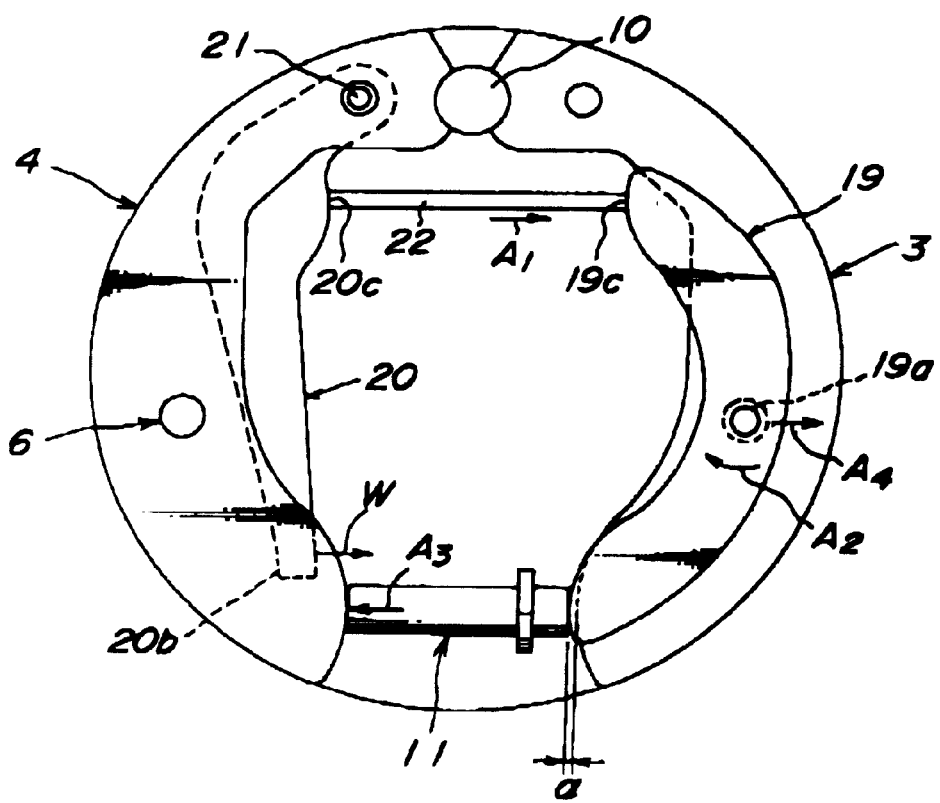
FIG_3

FIG._4
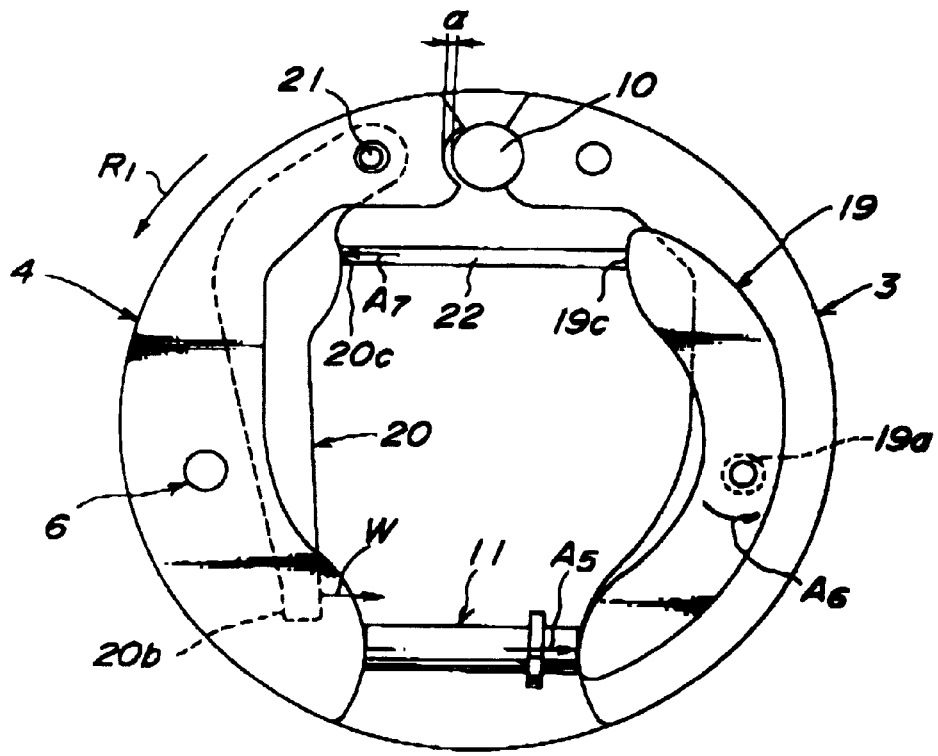
FIG._5
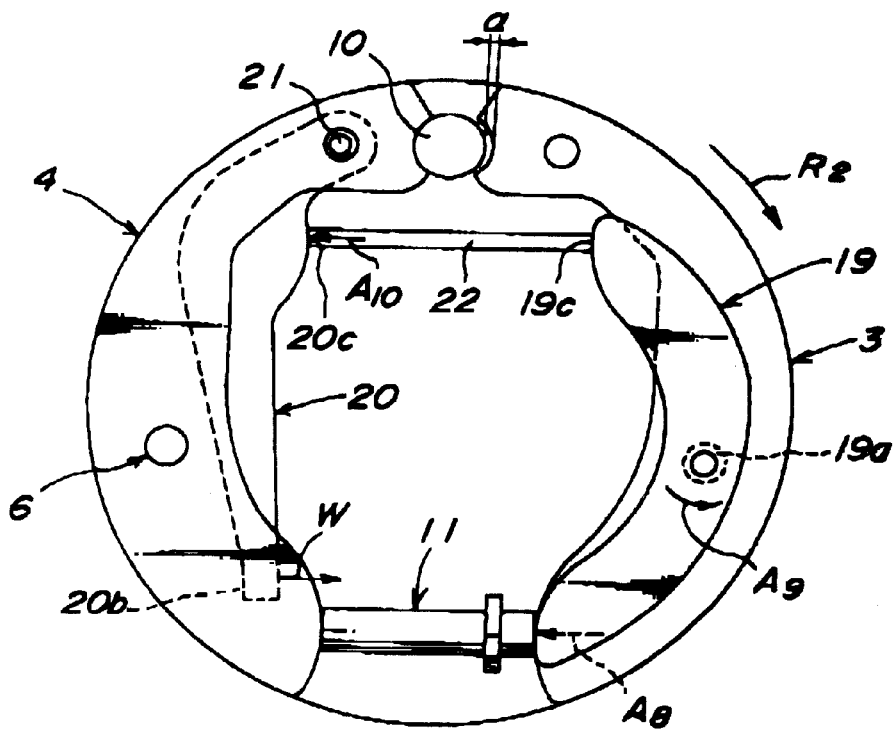

DUO-SERVO TYPE DRUM BRAKE DEVICE

BACKGROUND OF THE INVENTION

1. Field of the Invention

The invention relates to the improvement of a duo-servo type drum brake device for use in rear brakes or transmission brake of automobiles.

2. Description of the Related Art

The brake devices of this kind are usually constructed as shown in FIG. 6, for example.

A pair of brake shoes 51, 52 are disposed opposite to each other so as to abut against a fixed anchor member 53 at one adjacent end portions thereof, which are located on the upper portion of the drawing, and so as to abut against both ends of a shoe gap adjuster 54 at the other adjacent end portions thereof.

Shoe return springs 55 to 57 are provided to cause both the brake shoes 51, 52 to abut against the anchor member 53 and the shoe gap adjuster 54.

A wheel cylinder 58 is disposed between both of the brake shoes 51, 52 adjacent to the anchor member 53. A parking brake operating lever 60 is pivoted on the end portion of the brake shoe 52 on the side of the anchor member 53 by means of a pin 59, and a strut 61 is disposed between the intermediate portion between the basal end and the operating side end of the parking brake operating lever 60, and the brake shoe 51.

According to the above construction, the supply of the braking hydraulic pressure to the wheel cylinder 58 by the service brake causes both the brake shoes 51, 52 to be opened in the direction away from each other around abutment points with the shoe gap adjuster 54, respectively, and then to be pressed to the inner circumferential surface of the brake drum 62. On this occasion, both the brake shoes 51, 52 are apart from the anchor member 53, respectively.

There will be described a case in which a braking action caused when the brake drum 62 receives a torque in the direction shown by the arrow R will now be described. The rotation of the brake drum 62 causes the brake shoes 51, 52, the shoe gap adjuster 54, and the parking brake operating lever 60 to be rotated in the direction shown by the arrow R, thereby causing the brake shoe 51 to be displaced in the corresponding direction according to the gap with the anchor member 53 and then to be struck thereagainst, with impossible rotation, which brings about a predetermined braking action.

When the brake drum 62 receives a torque in the direction opposite to that shown by the arrow R, a predetermined braking action is not caused until the brake shoe 52 is displaced in the above-mentioned opposite direction according to the gap with the anchor member 53 to be struck thereagainst.

When the parking brake applies the operating force shown by W in FIG. 6 to the operating end of the parking brake operating lever 60, the lever 60 is rotated around the pin 59 in the counterclockwise direction, thereby causing the brake shoe 51 to be opened through the strut 61.

This causes the brake shoe 51 to be contacted to the inner circumferential surface of the brake drum 62, thereby causing the lever 60 to be rotated around the abutment point with the strut 61 in the counter-clockwise direction as is the case with above case, which causes the brake shoe 52 to be opened through the pin 59.

As a result, both the brake shoes 51, 52 are friction-contacted to the inner circumferential surface of the brake drum 62, which provides a predetermined parking brake action on the same principle as the service brake.

Then the braking action due to the above-mentioned service brake and parking brake indispensably causes the brake shoe 51 or 52 to strike the anchor member 53, thereby inevitably bringing about a tap at the time of the shoe striking mentioned-above, which makes a driver or passengers feel uncomfortable.

Also, since the brake shoe 51 or 52 repeatedly strikes the anchor member 53, the anchor member 53 itself and the attaching portion of the anchor member 53 are required to be improved in strength; therefore the conventional duo-servo type drum brake device shows a tendency to be increased in weight and in cost, with disadvantageous results.

Further, when the brake drum 62 receives a torque in the direction shown by the arrow R in FIG. 6 during using the parking brake, the brake action is not caused until the brake shoes 51, 52, the shoe gap adjuster 54, and parking brake operating lever 60 are rotated in the direction shown by the arrow R according to the above-mentioned gap with the rotation of the brake drum 62, during which the parking brake cable undesirably loosens, which may cause the braking force to be lowered.

DISCLOSURE OF THE INVENTION

It is, therefore, a primary object of the present invention to eliminate the need for the brake shoes striking the anchor member at the time of the braking action to thereby solve the former two problems.

To attain the above object, according to the present invention, there is provided a duo-servo type drum brake device comprising a pair of brake shoes that are disposed opposed to each other so as to abut against a fixed anchor member at one adjacent end portions thereof, respectively, and to abut against both end portions of a shoe gap adjuster at the other adjacent end portions thereof, respectively, and a brake shoe opening means disposed adjacent to the anchor member, wherein a link is pivoted on one of the brake shoes between its both end portions, and both end portions of the link are linked to the brake shoe opening means and the shoe gap adjuster, such that the brake shoes are adapted to be indirectly opened through the link when the brake shoe opening means operates, and the one of the brake shoes is, when opening, adapted to be separated from the shoe gap adjuster while being surely kept abutting against the anchor member.

With the above-mentioned arrangement of the duo-servo type drum brake device according to the present invention, it is possible to prevent any one of the brake shoes from striking the anchor member at the time of braking, thereby eliminating discomfort due to the tap conventionally caused when striking, and eliminating the need for increasing the strength of the anchor member and the attaching portion thereof, with the weight-wise and cost-wise advantages.

An advantageous embodiment of the present invention relates to a duo-servo type drum brake device of a hydraulic brake, wherein the brake shoe opening means comprises a hydraulic cylinder.

Another advantageous embodiment of the present invention relates to a duo-servo type drum brake device, wherein the brake shoe opening means comprises a mechanical link mechanism. Such an arrangement serves effectively to solve the problem of the conventional construction that the brake cable tends to loosen.

Still another advantageous embodiment of the present invention relates to a duo-servo type drum brake device, wherein the brake shoe opening means comprises both a hydraulic cylinder and a mechanical link mechanism.

The present invention is preferably carried out so as to attain the intended functions at a low cost by employing an existing shoe return spring force.

This can be achieved by an arrangement wherein, in order for one of the brake shoes to be, when opening, separated from the shoe gap adjuster while being surely kept abutting against the anchor member, a moment of rotation in such a direction as to press the one of the brake shoes on the anchor member is larger than a moment of rotation in such a direction as to press it on the shoe gap adjuster, out of the moments of rotation acting on one of the brake shoes around a pivoting point of the link by shoe return springs.

The duo-servo type drum brake device according to the present invention is featured by an arrangement wherein one of the brake shoe and the link are constructed so as to be pivoted by the mutual fitting between a protrusion formed on one of the brake shoes in pressmolding and a hole disposed on the link, or between a hole disposed on the one of the brake shoes and a protrusion formed on the link. Such an arrangement makes it possible to realize the pivoting construction at a low cost. In this instance, the protrusion may have a hole formed by a burring work, and the hole of the protrusion is utilized as a pin insertion hole of a brake shoe holding mechanism. This serves readily to realize the desired space-saving, miniaturizing and cost-reduction of the drum brake device at a further reduced cost.

Further objects and advantages of the invention will be apparent from the following description of the preferred embodiments of the invention as illustrated in the accompanying drawings.

BRIEF DESCRIPTION OF THE DRAWINGS

FIG. 2 is a detailed enlarged sectional view of the drum brake device according to the embodiment, showing a pivoting construction disposed between one of the brake shoes and a link;

FIG. 3 is a view of the drum brake device according to the embodiment, explaining its braking process;

FIG. 4 is a view of the drum brake device according to the embodiment in which the drum brake receives a torque in one direction, explaining its function;

FIG. 5 is a view of the drum brake device according to the embodiment in which the drum brake receives a torque in the other direction, explaining its function.

DETAILED DESCRIPTION OF THE PREFERRED EMBODIMENT

One preferred embodiment of the invention, by way of examples only, will now be described with reference to the drawings.

Figure 1:
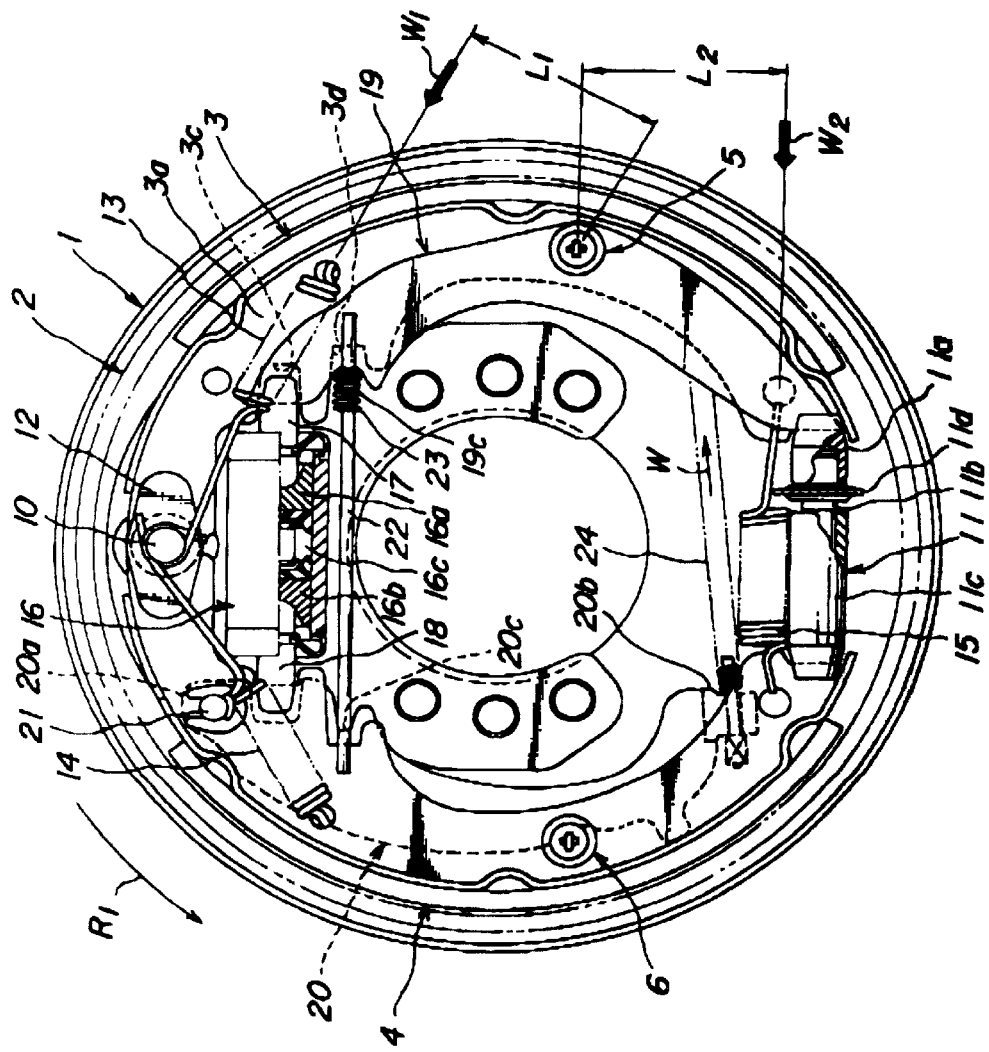
FIG. 1 is a front view of a duo-servo type drum brake device according to an embodiment of the invention in which a brake drum is eliminated.
Figure 6:
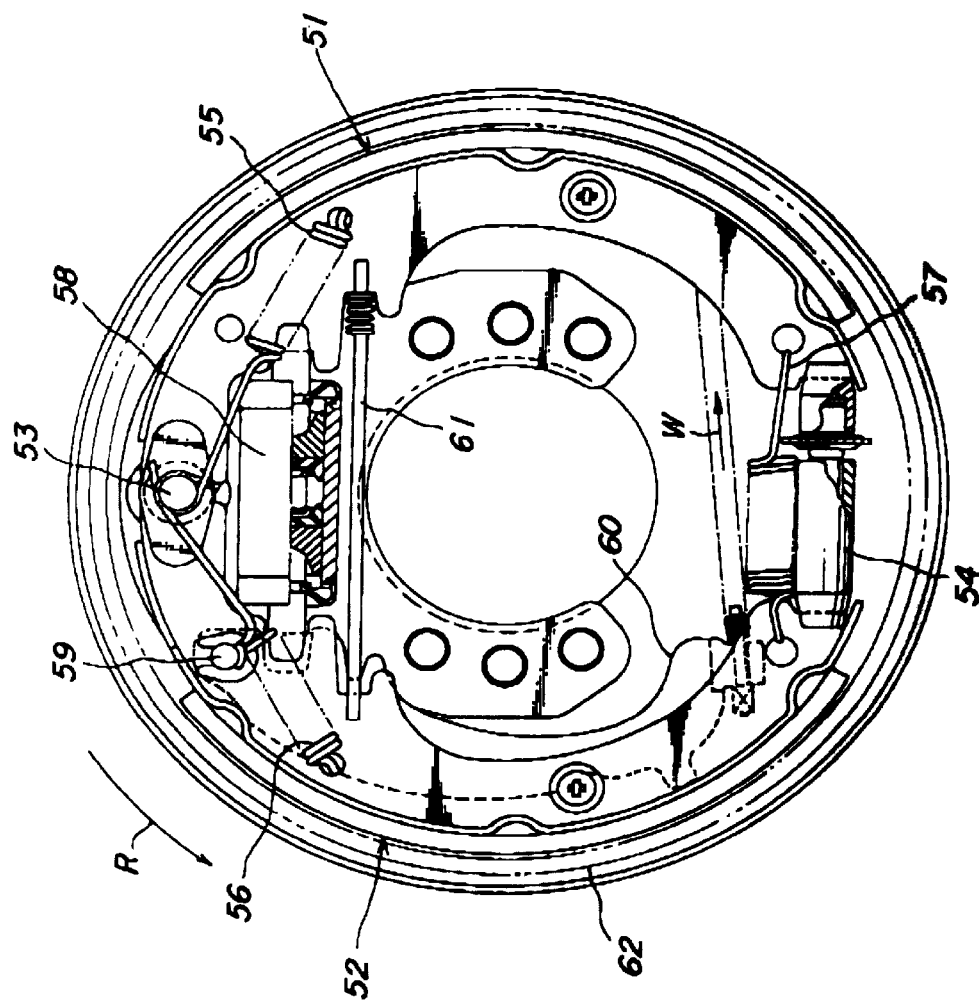
FIG. 6 is a front view of the above-mentioned. conventional duo-servo drum brake device in which the brake drum is eliminated.

FIG. 1 and FIG. 2 show a duo-servo type drum brake device according to an embodiment of the invention, which has both the service braking function and the parking braking function, and has a construction which is serviceable for rear brakes of automobiles.

First of all, the drum brake device will be described in general with reference to FIG. 1.

Reference numeral 1 designates a fixed back plate attached to a vehicle (not shown). This back plate 1 closes an axial directionwise opening end (the opposite side of FIG. 1) of a brake drum 2 (in FIG. 1, only a periphery wall portion is represented by a two-dot chain line), defines a space in association with the brake drum 2. Parts of the brake are incorporated in the space as described later.

In other words, as clearly shown in FIG. 1, a pair of brake shoes 3, 4 are disposed opposed to the inner circumferential surface of the brake drum 2, and are resiliently supported, so as to be displaced within a limitation range, on the back plate 1 through brake shoe holding mechanisms 5, 6, respectively.

The brake shoe holding mechanisms 5, 6 are substantially identical in construction, so only the brake shoe holding mechanism 5 will be described hereinbelow with reference to FIG. 2. The brake shoe holding mechanism 5 is, as well known, constructed by a pin 7 extending from the back plate 1, and passing through a web 3a of a brake shoe 3, a cup washer 8 engaged with the end portion of the pin 7 which is away from the back plate 1, and a coil spring 9 compressedly disposed between the web 3a of the brake shoe 3 and the cup washer 8.

Then the brake shoes 3, 4 are disposed opposed to each other so as to abut against a fixed anchor member 10 embedded into the back plate 1 at the one adjacent end portions thereof, respectively, which is located on the upper portion of FIG. 1, and to abut against the both end portions of a shoe gap adjuster 11 at the other end portions thereof, respectively.

A guide plate 12 is engaged with the anchor member 10 in order to prevent the end portions of the break shoes 3, 4 abutted against the anchor member 10 from being lifted, and then upper return springs 13, 14 are stretched between the anchor member 10 and the brake shoes 3, 4, respectively. The tension of the upper return springs 13, 14 causes the corresponding adjacent end portions of the brake shoes 3, 4 to resiliently abut against the anchor member 10.

A lower return spring 15 is bridged with tension between the other end portions of the brake shoes 3, 4, thereby causing the other end portions to abut against the both end portions of the shoe gap adjuster 11, respectively.

The shoe gap adjuster 11 comprises a bolt member 11b rotatably abutted to the brake shoe 3 through a socket member 11a, and a nut member 11c abutted to the brake shoe 4 non-rotatably, while thee bolt member 11b and the nut member 11c being screwed with each other.

Then an adjusting cogwheel 11d is integrally disposed on the outer periphery of the bolt member 11b. Rotating the cogwheel 11d by a tool brings about a screw action between the bolt member 11b and the nut member 11c, thereby enabling the gap between the brake drum 2 and the brake shoes 3, 4 to be adjusted.

A wheel cylinder 16 as a brake shoe opening means is interposed between the brake shoes 3, 4 in the vicinity of the anchor member 10, and then fixed to the back plate 1.

The wheel cylinder 16 has pistons 16a, 16b slidably fitted therein, and then has a brake hydraulic pressure chamber 16c between the pistons 16a, 16b.

The chamber 16c receiving the brake hydraulic pressure generated by the operation of the service brake causes the pistons 16a, 16b to be pushed out, thereby providing a service brake operation through push rods 17, 18, as described later.

In particular, according to the present embodiment, along one of the brake shoes 3, that is, along the web 3a extends a link 19 which is rotatably pivoted on one of the brake shoes 3 at a location of the brake shoe holding mechanism 5 arranged between the both end portions of one of the brake shoes 3, as shown in FIG. 2.

In other words, a protrusion 19a of the link 19 is formed simultaneously with the press molding, and then the protrusion 19 is rotatably fitted to a hole 3b of the web 3a through which the pin 7 of the brake shoe holing mechanism 5 passes, where the link 19 is pressed on the web 3a by the coil spring 9 of the brake shoe holding mechanism 5.

Moreover, a hole 19b is formed on the protrusion 19a by the burring work, and then the pin 7 of the brake shoe holding mechanism 5 is passed through the hole 19b.

As shown in FIG. 1, the one end of the link 19 is linked to one of the push rods 17 at a location of the corresponding end of the wheel cylinder 16, and the other end is linked to the socket 11a of the shoe gap adjuster 11.

However, the push rod 17 and the brake shoe 3 are not directly linked to each other due to a notch 3c disposed on the brake shoe 3, thereby providing a. gap therebetween.

Moreover, the other of the push rods 18 of the wheel cylinder 16 is directly linked to the corresponding brake shoe 4.

In order for the moment of rotation, acting on the brake shoe 3 by the shoe return springs 13, 15, around a pivot point (location of the break shoe holding mechanism 5) of the link 19 to work as described later, the spring forces $W_1$, $W_2$ and the moment arm lengths $L_1$, $L_2$ are determined in such a manner that the moment of rotation ($W_1 \times L_1$) in such a direction as that the shoe return spring 13 presses the brake shoe 3 to the anchor member 10 is larger than the moment of rotation ($W_2 \times L_2$) in such a direction as that the shoe return spring 15 presses the brake shoe 3 to the shoe gap adjuster 11.

As shown in FIG. 1, the present embodiment further comprises a parking brake operating mechanism as another brake shoe opening means.

The parking brake operating mechanism has a parking brake operating lever 20 on the side of the other of the brake shoes 4. The parking brake operating lever 20 is pivoted on the end portion of the brake shoe 4, which is near the anchor member 10, through a pin 21 at the basal end 20a thereof, and a strut 22 is disposed between the portion 20c of the parking brake operating lever 20 offset on the side of the operating end 20b with respect to the proximate end 20a, and the portion 19c of the link 19 which is near the push rod 17. The parking brake operating lever 20 and the strut 22 constitute a mechanical crank mechanism for opening the break shoes 3, 4.

An anti-rattle spring 23 is wounded on the strut 22, thereby causing the strut 22 to be urged toward the parking brake operating lever 20 to prevent the vibration.

Moreover, in order to prevent the strut 22 and the brake shoe 3 from interfering with each other, a notch 3d is disposed on the brake shoe 3, thereby providing a gap between the strut 22 and the brake shoe 3.

The brake cable 24 is connected to the operating end 20b of the parking brake operating lever 25 20 at the one end thereof, and to a parking brake lever (not shown) in a driving seat at the other end thereof.

Hereupon, it is assumed that when the driver operates the above-mentioned parking brake lever for the purpose of the parking, the operating force shown by W in FIG. 1 is transmitted to the brake cable 24, and then to the operating end 20b of the parking brake operating lever 20.

Then, the action of the above-mentioned duo-servo type drum brake device according to the present embodiment will now be described.

Incidentally, because the braking action caused by the wheel cylinder 16 during using the service brake is identical with that caused by the lever 20 during using the parking brake, the latter braking action during using the parking brake will now be described with reference to FIGS. 3 to 5.

In the non-acting condition shown in FIG. 1, when the parking brake operating force W is input tot the operating end 20b of the parking brake operating lever 20, the brake operating lever 20 is rotated around the pin 21 in the anti-clockwise direction as shown in FIG. 3.

With such a rotation of the brake operating lever 20, the strut 22 is stroked in the direction shown by the arrow $A_1$ in FIG. 3, thereby causing the link 19 to be rotated relatively around the protrusion 19a with respect to the brake shoe 3 in the direction shown by the arrow $A_2$.

The rotation of the link 19 causes the shop gap adjuster 11 to be pressed in the direction shown by the arrow $A_3$, thereby causing the brake shoe 4 to be opened in the corresponding direction with the abutting portion with the anchor member 10 as a fulcrum, that is, while being abutted against the anchor member 10. This causes the brake shoe 4 to friction-contact to the inner circumferential surface of the brake drum 2 (refer to FIG. 1).

Thereafter, the brake shoe 4 stops, thereby disabling the shoe gap adjuster 11 to be displaced in the direction shown by the $A_3$ and then to be stopped.

Therefore, the displacement of the strut 22 in the direction shown by the arrow $A_1$ causes the link 19 to be rotated in the corresponding direction with the abutting portion with the shoe gap adjuster 11 as a fulcrum. Such a rotation of the link 19 causes the protrusion 19a to be displaced in the direction shown by the arrow $A_4$, thereby causing the brake shoe 3 to be opened through the protrusion 19a.

When the brake shoe 3 is opened, the moment of rotation ($W_1 \times L_1$) in such a direction as that the shoe return spring 13 presses the brake shoe 3 to the anchor member 10 is, as described above, larger than the moment of rotation ($W_2 \times L_2$) in such a direction as that the shoe return spring 15 presses the brake shoe 3 to the shoe gap adjuster 11, which causes the brake shoe 3 to be separated and opened by α from the shoe gap adjuster 11 while being abutted against the anchor member 10 to cause it to friction-contact to the inner circumferential surface of the brake drum 2 (refer to FIG. 1), as shown in FIG. 3.

There will be described a case in which the brake drum 2 receives a torque in the direction shown by the arrow $R_1$ shown in FIGS. 1 and 4. The brake shoe 4, the lever 20, and the shoe gap adjuster 11 are, as shown in FIG. 4, rotated in the direction shown by the arrow $R_1$ together with the brake drum 2 starting from the state shown in FIG. 3 due to the gap a between the brake shoe 3 and the shoe gap adjuster 11 shown in FIG. 3.

On this occasion, the shoe gap adjuster 11 is displaced by the gap α shown in FIG. 3 in the direction shown by the arrow $A_5$ in FIG. 4 to thereby abut against the corresponding end portion of the brake shoe 3. Incidentally, the brake shoe 3 contacts the inner circumferential surface of the brake drum 2 and then abuts against the anchor member 10, with impossible displacement. This causes the shoe gap adjuster 11 to be stopped at a location where it abuts against the brake shoe 3, thereby enabling the brake drum 2 to be rotated further more, which provides a predetermined braking action.

However, at the time of the brake action, neither of the brake shoes 3, 4 strikes the anchor member 10, which solves the conventional problem of the tap that inconviences the driver or passengers, and further eliminates the need for raising the strength of the anchor mermber 10 and the attaching portion thereof, with weight-wise and cost-wise advantages.

The above-mentioned rotation of the brake shoe 4 in the direction shown by the arrow $R_1$ provides the gap α substantially the same as that in FIG. 3 between the brake shoe 4 and the anchor member 10 as shown in FIG. 4. The displacement of the pin 21 in the corresponding direction causes the cable 24 connected to the operating end 20b of the lever 20 (refer to FIG. 1) to be loosened.

However, the displacement of the shoe gap adjuster 11 in the direction shown by the arrow $A_5$ in FIG. 4 causes the link 19 to be rotated in the direction shown by the arrow $A_6$ in FIG. 4, which causes the strut 22 to be displaced in the direction shown by the arrow $A_7$. This causes the lever 20 to be rotated around the pin 21 in the clockwise direction.

Moreover, the displacement amount of the strut 22 in the direction shown by the arrow $A_7$ can be freely varied depending on the lever ratio of the link 19. In other words, the closer the protrusion 19a of the link 19 is arranged to a side of the shoe gap adjuster 11, the larger is the displacement amount of the upper arm portion of the link 19, that is, the displacement amount of the strut 22 in the direction shown by the arrow $A_7$, thereby resulting in the optional selection of this displacement amount.

Even it the above-mentioned displacement of the pin 21 loosens the cable 24 (refer to FIG. 1) connected to the operating end 20b of the lever 20, the clockwise rotation of the lever 20 around the pin 21 in the clockwise direction caused due to displacement of the strut 22 in the direction shown by the arrow $A_7$ prevents the loosening, which in capable of solving the problems of the conventional construction that the braking force is small due to the loosening of the cable 24 (refer to FIG. 1).

When the brake drum 2 (refer to FIG. 1) receives a torque in the direction opposite to that shown by the arrow $R_1$ in FIG. 1, that is, a torque in the direction shown by the arrow $R_2$ in FIG. 5, the brake shoe 3 is rotated, from the state in FIG. 3, together with the brake drum 2 in the direction shown by the arrow $R_2$ in FIG. 5, resulting from the gap α between the brake shoe 3 and the shoe gap adjuster 11 shown in FIG. 3.

On this occasion, the end portion of the brake shoe 3 which is near the shoe gap adjuster 11 is displaced in the direction shown by the arrow $A_8$, in FIG. 5 to thereby abut against the shoe gap adjuster 11. Then the brake shoe 4 contacts the inner circumferential surface of the brake drum 2 (refer to FIG. 1), and then abuts against the anchor member 10, thereby disabling the shoe gap adjuster 11 to be displaced in the direction shown by the arrow $R_2$ in FIG. 5. Therefore, the brake shoe 3 abuts against the shoe gap adjuster 11, with impossible rotation, thereby disabling the brake drum 2 to be further rotated, which brings about a predetermined braking action.

However, at the time of the braking action, neither of the brake shoes 3, 4 strikes the anchor member 10, which solves the conventional problem that the tap inconvience the driver or passengers, and furthermore eliminates the need for raising the strength of the anchor 10 and the attaching portion thereof, with weight-wise and cost-wise advantages.

The above-mentioned rotation of the brake shoe 3 in the direction shown by the arrow $R_2$ provides the gap α substantially the same as that shown in FIG. 3 between the brake shoe 3 and the anchor member 10 as shown in FIG. 5, and causes the link 19 to be rotated in the direction shown by the arrow $A_9$ shown in FIG. 5, simultaneously. Such a rotation of the link 19 causes the strut 22 to be displaced in the direction shown by the arrow $A_{10}$, which causes the lever 20 to be rotated around the pin 21 in the clockwise direction.

Such a rotation of the lever 20 causes the cable 24 (refer to FIG. 1) connected to the operating end 20b to be tensioned, thereby increasing the braking force rather than decreasing it.

The above-mentioned action and effect can be obtained also at the time of braking in which the wheel cylinder 16 is operated by the service brake.

Moreover, in the duo-servo type drum brake device of the present embodiment, provided with both the hydraulic wheel cylinder 16 and the mechanical brake operating systems 20 to 23 as the brake shoe opening means, the link 19 is associated with both the above brake shoe opening systems, which provides, if any one of both the above brake shoe opening means works, the above-mentioned effect.

However, it goes without saying that the link 19 may be associated with only one of the brake shoe opening means. Also, it is of course that the above, idea can be applied to the duo-servo type drum brake device having only one of the brake shoe opening means, and to the duo-servo type drum brake device utilizing the mechanical brake shoe opening means as the service brake.

Further, the idea of the invention can be applied to the case in which the anchor member 10 is of cylinder type instead of prism type, also to the case in which the spring 9 of the brake shoe holding mechanism 5 is of plate spring type instead of coil spring type.

Moreover, the idea of the invention can be applied to the case in which common one shoe return spring disposed between the brake shoes 3, 4 is used instead of the upper shoe return springs 13, 14, the case in which the wheel cylinder 16 is of pneumatic type, the case in which the brake shoes 3, 4 are opened directly through the pistons 16a, 16b not through the push rods 17, 18, and the case in which the brake operating lever 20 is of cross pull type in which the back plate 1 is fitted therein with play, instead of a forward-pull type shown in the drawing.

Many widely different embodiments of the invention may be constructed without departing from the spirit and scope of the invention. It should be understood that the invention is not limited to the specific embodiments described in the specification, except as defined in the appended claims.

What is claimed is:

1. A duo-servo type drum brake device comprising:
    an anchor member affixed to a non-rotatable member of a vehicle;
    a brake shoe operator adjacent to said anchor member and having movable rods at ends thereof;
    a shoe gap adjuster spaced from said brake shoe operator;
    a pair of brake shoes disposed opposed to each other so as to abut against said anchor member at first adjacent end portions thereof, respectively, and to abut against both end portions of said shoe gap adjuster at second adjacent end portions thereof, respectively; and
    a link pivotally connected to one of said brake shoes between its both end portions, both end portions of said link being linked to said brake shoe operator and said shoe gap adjuster, so that said brake shoes are indirectly operated through said link when said brake shoe operator operates, wherein said one of said brake shoes is, when operating, separated from said shoe gap adjuster while being kept abutting against said anchor member, and wherein a braking force of each of said brake shoes is transmitted to the other of said pair of brake shoes, when a braking force is applied.

2. A duo-servo type drum brake device according to claim 1, wherein said brake shoe operator comprises a hydraulic cylinder.

3. A duo-servo type drum brake device according to claim 1, wherein said brake shoe operator comprises a mechanical link mechanism.

4. A duo-servo type drum brake device according to claim 1, wherein said brake shoe operator comprises both of a hydraulic cylinder and a mechanical link mechanism.

5. A duo-servo type drum brake device according to claim 1, wherein in order for said one of said brake shoes to be, when operated, separated from said shoe gap adjuster while being kept abutting against said anchor member, a moment of rotation in such a direction as to press said one of said brake shoes on said anchor member is larger than a moment of rotation in such a direction as to press it on said shoe gap adjuster, out of the angular moments acting on said one of said brake shoes around a pivoting point of said link by a shoe return spring.

6. A duo-servo type drum brake device according to claim 1, wherein said one of said brake shoes and said link are constructed so as to be pivoted by the mutual fitting between a protrusion formed on one of said one of said brake shoes and said link in press-molding, and a hole disposed on the other of said one of said brake shoes and said link.

7. A duo-servo type drum brake device according to claim 6, wherein said protrusion has a hole formed by a burring work, and said hole of said protrusion is utilized as a pin insertion hole of a brake shoe holding mechanism.

8. A duo-servo type drum brake comprising:

a back plate with an anchor member affixed thereto;

a brake shoe operator adjacent to said anchor member and having movable rods at ends thereof;

a shoe gap adjuster spaced from said brake shoe operator;

a pair of brake shoes, each of said brake shoes being movably joined to said back plate with a brake shoe holder, a first one of said brake shoes having one movable free end that is urged into abutment with said anchor member with a first spring and another movable free end that is urged into abutment with a respective end of said shoe gap adjuster with a second spring, said first spring having a force holding said one movable free end of said first brake shoe abutting said anchor member when said brake shoe operator is operated; and a link pivotally connected to said first brake shoe with a pivot point being intermediate between both ends thereof, said link having a first end linked to a respective one of said rods and a second end linked to the end of said shoe gap adjuster against which the another movable free end of said first brake shoe is held.

9. The brake of claim 8, wherein said first spring has a spring force $W_1$ and is connected to said first brake shoe a distance $L_1$ from said pivot point thereof and said second spring has a spring force $W_2$ and is connected to said first brake shoe a distance $L_2$ from said pivot point thereof, a moment $W_1 \times L_1$ of said first spring applied to said first brake shoe being greater than a moment $W_2 \times L_2$ of said second spring applied to said first brake shoe.

10. The brake of claim 8, wherein said pivot point is used as said brake shoe holder of said first brake shoe, and comprises a pin that extends through said link, said first brake shoe, and said back plate and that is approximately midway between the first and second ends of said link.

11. The brake of claim 8, wherein said first brake shoe comprises a notch adjacent the first end of said link so that said brake shoe operator avoids contacting said first brake shoe.

12. The brake of claim 8, wherein said first spring has one end affixed to said anchor member and another end affixed to said first brake shoe.

13. The brake of claim 8, wherein a second one of said brake shoes is movably joined to said back plate with a further brake shoe holder and has one movable end held abutting said anchor member with a third spring different from said first spring and another movable end held abutting a respective end of said shoe gap adjuster with said second spring.

14. The brake of claim 13, further comprising a parking brake lever and a pin attaching said parking brake lever to said second brake shoe.

15. A duo-servo type drum brake comprising:

a back plate with an anchor member affixed thereto;

a brake shoe operator adjacent to said anchor member;

a shoe gap adjuster spaced from said brake shoe operator;

a pair of brake shoes, a first one of said brake shoes being movably joined to said back plate with a brake shoe holder and having one movable free end that is urged into abutment with said anchor member with a first spring and another movable free end that is urged into abutment with a respective end of said shoe gap adjuster with a second spring; and a link pivotally connected to said first brake shoe with a pivot point being intermediate between both ends thereof, said link having a first end linked to said brake shoe operator and a second end linked to the end of said shoe gap adjuster against which the another movable free end of said first brake shoe is held, said first spring having a spring force $W_1$ and being connected to said first brake shoe a distance $L_1$ from said pivot point thereof and said second spring having a spring force $W_2$ and being connected to said first brake shoe a distance $L_2$ from said brake shoe holder thereof, a moment $W_1 \times L_1$ of said first spring applied to said first brake shoe being greater than a moment $W_2 \times L_2$ of said second spring applied to said first brake shoe, whereby the one movable free end of said first brake shoe is held abutting said anchor member when said brake shoe operator is operated.

16. The brake of claim 15, wherein said pivot point is used as said brake shoe holder of said first brake shoe, and comprises a pin that extends through said link, said first brake shoe, and said back plate and that is approximately midway between the first and second ends of said link.

17. The brake of claim 15, wherein said first brake shoe comprises a notch adjacent the first end of said link so that said brake shoe operator avoids contacting said first brake shoe.

18. The brake of claim 15, wherein said first spring has one end affixed to said anchor member and another end affixed to said first brake shoe.

19. The brake of claim 18, wherein a second one of said brake shoes is movably joined to said back plate with a further brake shoe holder and has one movable end held abutting said anchor member with a third spring different than said first spring and another movable end held abutting a respective end of said shoe gap adjuster with said second spring.

20. The brake of claim 19, further comprising a parking brake lever and a pin attaching said parking brake lever to said second brake shoe.

* * * * *